(12) United States Patent
Yu

(10) Patent No.: US 7,536,904 B1
(45) Date of Patent: May 26, 2009

(54) TIRE PRESSURE DETECTOR AND VALVE STEM ASSEMBLY

(75) Inventor: Hung-Chih Yu, Taichung (TW)

(73) Assignee: Orange Electronic Co., Ltd. (TW)

( * ) Notice: Subject to any disclaimer, the term of this patent is extended or adjusted under 35 U.S.C. 154(b) by 0 days.

(21) Appl. No.: 12/070,452

(22) Filed: Feb. 19, 2008

(51) Int. Cl.
*B60C 23/02* (2006.01)

(52) U.S. Cl. .................................. 73/146.8; 73/146

(58) Field of Classification Search ......... 73/146–148.8
See application file for complete search history.

(56) References Cited

U.S. PATENT DOCUMENTS 6,199,575 B1 * 3/2001 Widner .................. 137/227
6,817,235 B2 * 11/2004 Sapir ........................ 73/146
6,952,955 B1 * 10/2005 Uleski ....................... 73/146
6,952,957 B2 * 10/2005 Kayukawa ................ 73/146.8

* cited by examiner

*Primary Examiner*—Andre J Allen
*Assistant Examiner*—Jermaine Jenkins
(74) *Attorney, Agent, or Firm*—Jackson Walker, LLP

(57) ABSTRACT

The tire pressure detector and valve stem assembly has a valve stem, a wireless pressure detector and a fastener. The valve stem has an outer section and an inner section. The inner section is integrally and coaxially formed on the outer section and has a distal end, an outlet hole, a sidewall and at least one clamping surface. The at least one clamping surface is flat and is tangentially formed on the sidewall. To assemble, only a regular tool such as a clamp or a spanner is necessary to clamp the inner section on the clamping surface when mounting or dismounting the valve stem onto or from a rim.

5 Claims, 6 Drawing Sheets

TIRE PRESSURE DETECTOR AND VALVE STEM ASSEMBLY

BACKGROUND OF THE INVENTION

1. Field of Invention

The present invention relates to a tire pressure detector and valve stem assembly, and more particularly to a tire pressure detector and valve stem with clamping surfaces formed thereon to improve ease of assembling the valve steam onto a rim.

2. Description of the Related Art

Car electronics have far improvement recently because people care about driving safety more and more nowadays. For instance, a tire pressure monitoring system (TPMS) is applied for monitoring air pressure inside tires of a vehicle.

With reference to FIG. 6, a conventional valve stem (60) designed for connecting with a tire pressure detector has an inner section (62). The inner section (62) is located between a rim and a tire when the valve stem (60) is mounted securely on the rim. The inner section (62) has a distal end, a sidewall and a fixing hole (622). The distal end is domical. The fixing hole (622) is formed in the sidewall. A specific service tool corresponding to the fixing hole (622) is necessary to prevent rotation of the inner section (62) when mounting or dismounting the valve stem (60) onto or from the rim. However, drivers have to look for specific service centers having the specific service tool when the valve stem (60) is needed to be assembled or disassembled, and this is troublesome. Furthermore, the fixing hole (622) is easily damaged after mounting the valve stem (60) on the rim with using the specific service tool.

The present invention provides a tire pressure detector and valve stem assembly to obviate or mitigate the shortcomings of the conventional valve stem.

SUMMARY OF THE INVENTION

The primary objective of the present invention is to provide a tire pressure detector and valve stem assembly to improve ease of assembling the valve stem for a tire pressure detector onto a rim.

The tire pressure detector and valve stem assembly has a valve stem, a wireless pressure detector and a fastener. The valve stem has an outer section and an inner section. The inner section is integrally and coaxially formed on the outer section and has a distal end, an outlet hole, a sidewall and at least one clamping surface. The at least one clamping surface is flat and is tangentially formed on the sidewall. Accordingly, only a regular tool, such as a clamp or a spanner is necessary to clamp the inner section on the clamping surface when mounting or dismounting the valve stem onto or from a rim.

Other objectives, advantages and novel features of the invention will become more apparent from the following detailed description when taken in conjunction with the accompanying drawings.

DETAILED DESCRIPTION OF THE INVENTION

Figure 1:
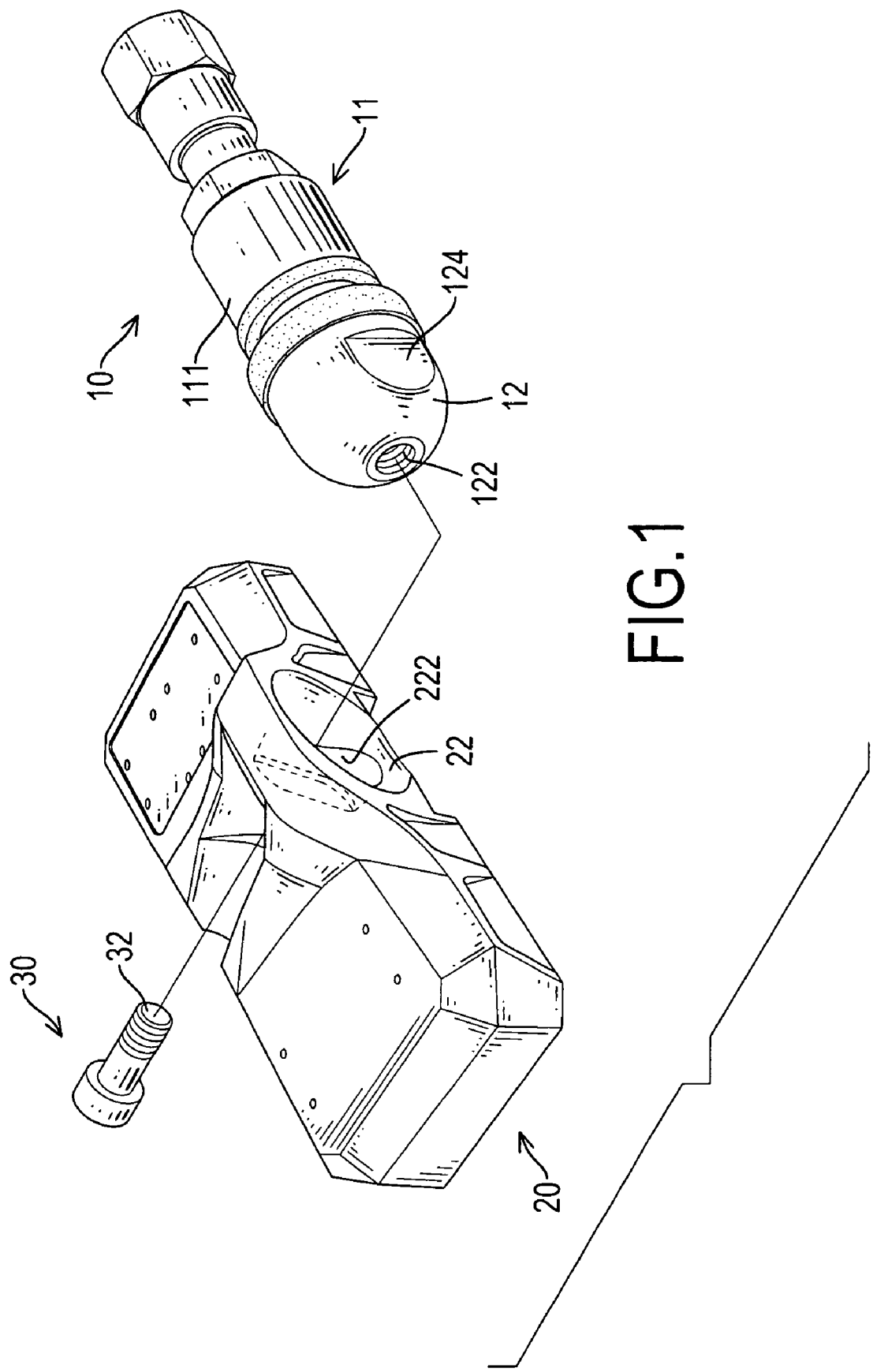
FIG. 1 is an exploded perspective view of a tire pressure detector and valve stem assembly in accordance with the present invention.
Figure 2:
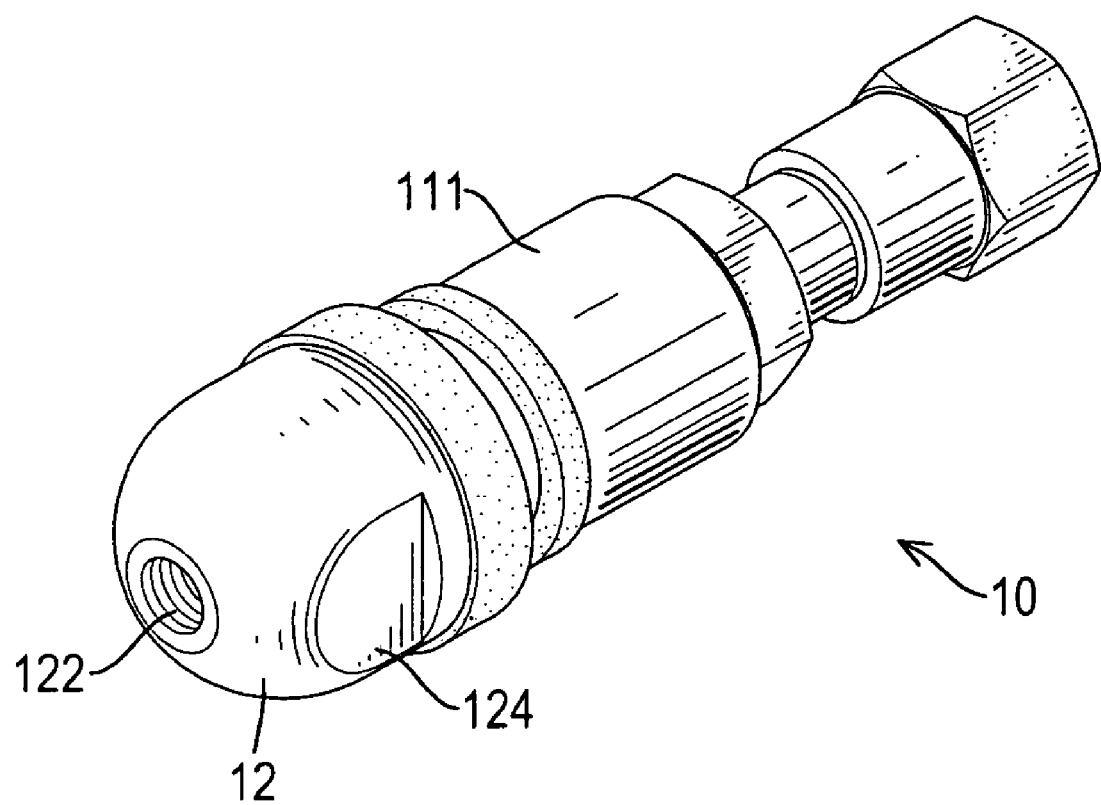
FIG. 2 is a perspective view of a valve stem with clamping surfaces of the assembly in FIG. 1.

With reference to FIGS. 1 and 2, a tire pressure detector and valve stem assembly in accordance with the present invention comprises a valve stem (10), a wireless pressure detector (20) and a fastener (30).

The valve stem (10) is tubular and has an outer section (11) and an inner section (12).

The outer section (11) has a fixing nut (111). The fixing nut (111) is removably and rotatably mounted on the outer section (11).

The inner section (12) is integrally and coaxially formed on the outer section (11) and has a distal end, an outlet hole (122), a sidewall and at least one clamping surface (124).

The distal end has a domical surface.

The outlet hole (122) is centrally formed through the domical surface, is longitudinally formed through the inner section (12) and has a threaded inner surface.

The at least one clamping surface (124) is tangentially formed on the sidewall, is flat and is capable to be clamped by tools such as clamps or spanners.

Figure 4:
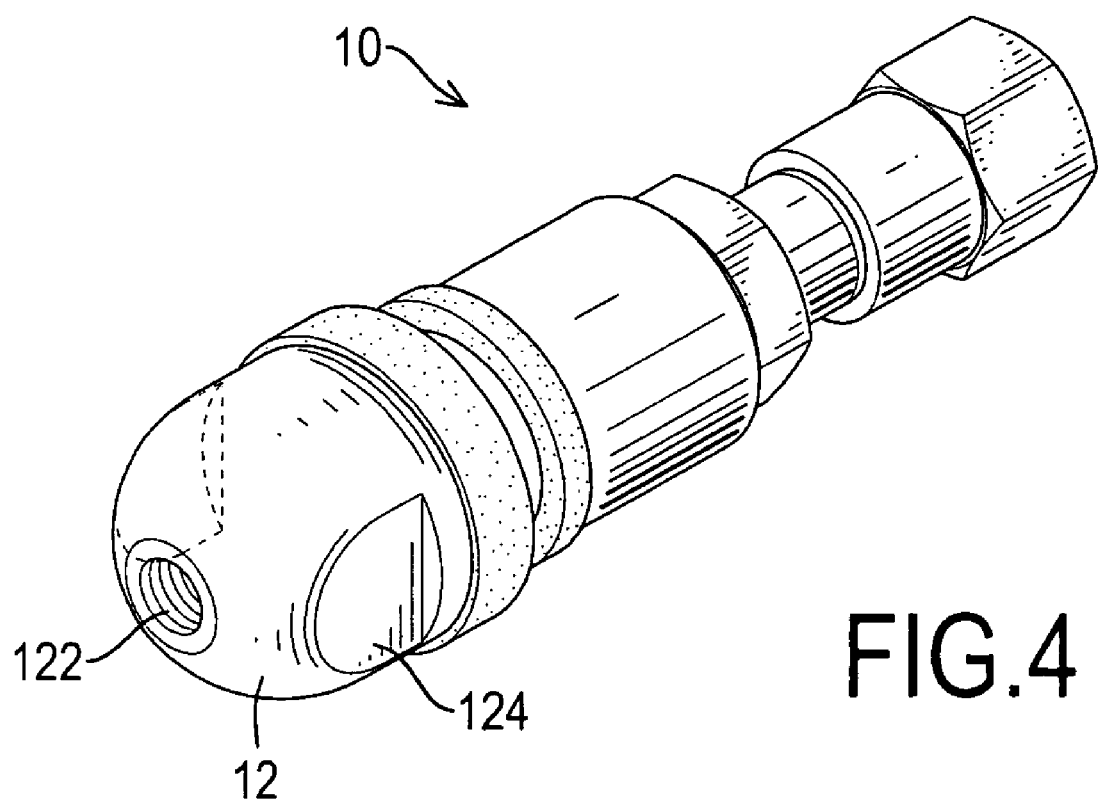
FIG. 4 is a perspective view of a second embodiment of a tire pressure detector and valve stem assembly with a pair of clamping surfaces in accordance of the invention.
Figure 5:
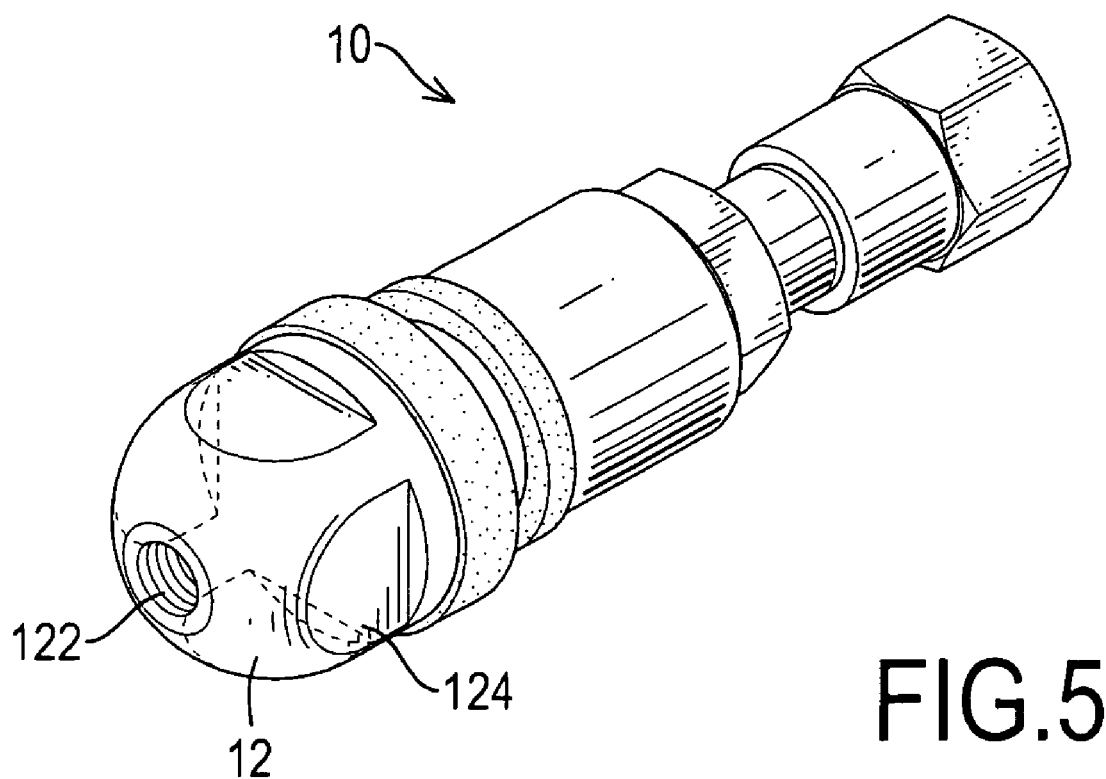
FIG. 5 is a perspective view of a third embodiment of a tire pressure detector and valve stem assembly with two pair of clamping surfaces in accordance of the invention.
Figure 6:
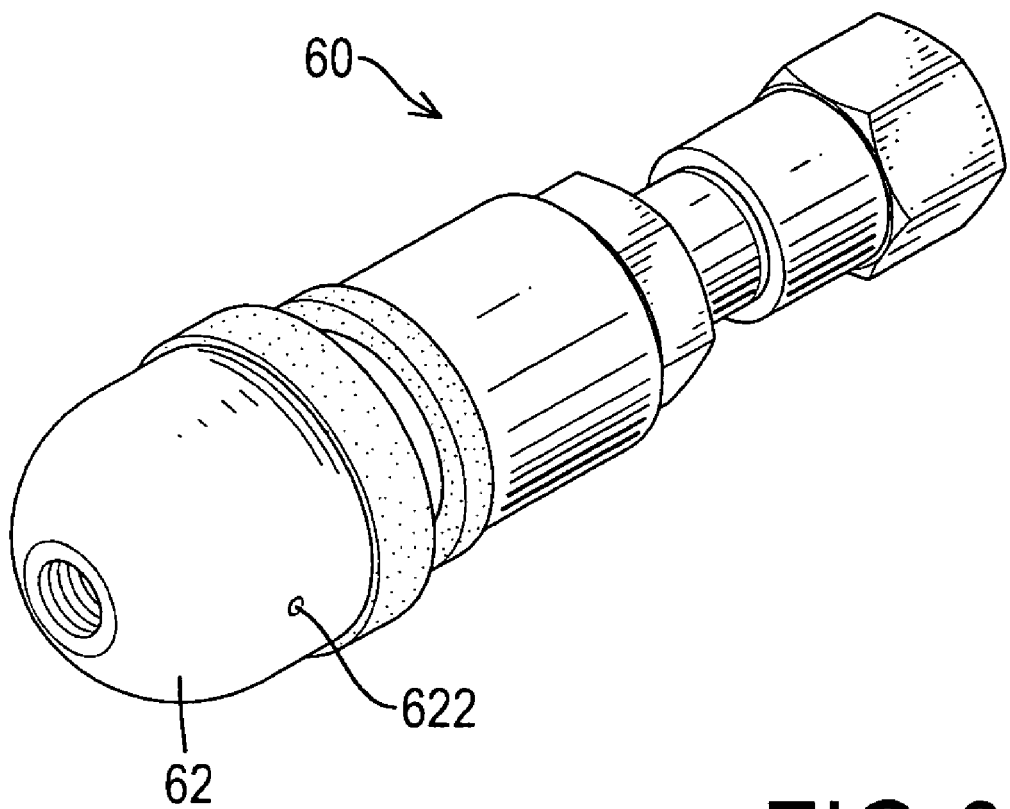
FIG. 6 is a perspective view of a conventional valve stem in accordance with the prior art.

With reference to FIGS. 4 and 5, preferably, at least one pair of paralleling clamping surfaces (124) are formed on the sidewall of the inner section (12) so that tools may selectively clamp one pair of the clamping surfaces (124) securely and the valve stem (10) is versatile and convenient in use.

The wireless pressure detector (20) is an electronic pressure detecting module, detects air pressure of a tire adjacent thereto, sends an electromagnetic wave signal corresponding to the air pressure to a tire pressure measurement system (TPMS) and has a mounting surface (22) and a mounting slot (222).

The mounting surface (22) is concave and corresponds to the domical surface.

The mounting slot (222) is formed through the mounting surface (22).

The fastener (30) is slidably and rotatably mounted through the mounting slot (222), is screwed with the threaded inner surface of the outlet hole (122) to secure the wireless pressure detector (20) on the domical surface of the distal end of the inner section (12) and has a hole (32). The hole (32) is formed longitudinally through the fastener (30).

Figure 3:
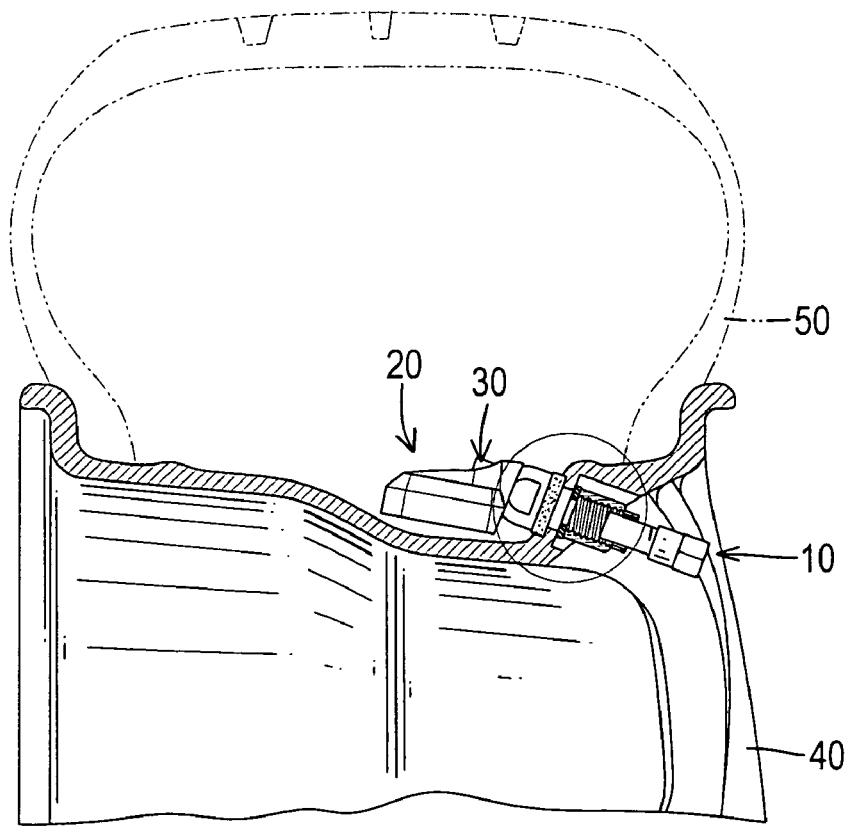
FIG. 3 is an operational side view in partial section of the tire pressure detector and valve stem assembly in FIG. 1, showing the valve stem being mounted through a rim of a tire.
Figure 3A:
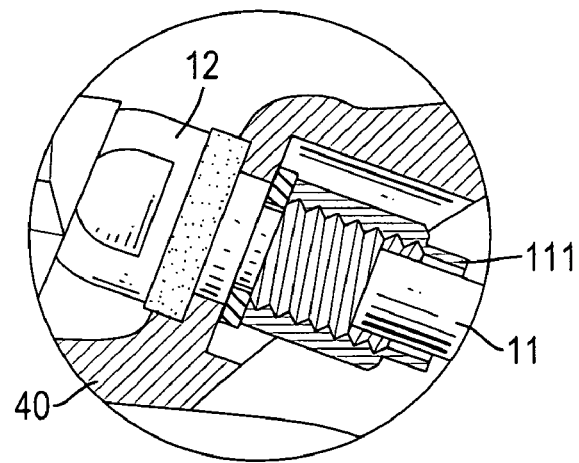
FIG. 3A is an enlarged side view in partial section of the tire pressure detector and valve stem assembly in FIG. 3.

With further reference to FIGS. 3 and 3A, when the valve stem (10) is mounted on a rim (40) of a tire (50), the fixing nut (111) is rotated and released firstly. Then, a technician may use a clamping tool to clamp the inner section (12) to prevent the valve stem (10) from rotating when the fixing nut (111) is rotated in reverse toward the rim (40) and to clamp the rim (40) with the fixing nut (111). The wireless pressure detector (20) is then securely mounted on the domical surface of the distal end of the outer section. With the arrangement of the domical surface on the valve stem (10), the mounting the wireless pressure detector (20) can be rotated and adjustable relative to the valve stem (10) to change the angle and position of the detector (20) relative to the rim (40).

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A tire pressure detector and valve stem assembly comprising:
 a valve stem being tubular and having
  an outer section having a fixing nut being removably and rotatably mounted on the outer section; and
  an inner section being integrally and coaxially formed on the outer section and having
   a distal end having a domical surface;
   an outlet hole being centrally formed through the domical surface, being longitudinally formed through the inner section and having a threaded inner surface;
   a sidewall; and
   at least one clamping surface being flat and being tangentially formed on the sidewall;
 a wireless pressure detector being an electronic pressure detecting module for detecting air pressure of a tire and sending an electromagnetic wave signal corresponding to the air pressure and having
  a mounting surface being concave and corresponding to the domical surface on the distal end of the inner section of the valve stem; and
  a mounting slot being formed through the mounting surface; and
 a fastener being slidably and rotatably mounted through the mounting slot and being screwed with the threaded inner surface of the outlet hole in the valve stem.

2. The tire pressure detector and valve stem assembly as claimed in claim 1, wherein the fastener further has a hole being formed longitudinally through the fastener.

3. The tire pressure detector and valve stem assembly as claimed in claim 2, wherein the inner section has two clamping surfaces being paralleled with each other and formed on the sidewall.

4. The tire pressure detector and valve stem assembly as claimed in claim 2, wherein the inner section has two pair of the paralleling clamping surfaces being formed on the sidewall.

5. The tire pressure detector and valve stem assembly as claimed in claim 2, wherein the inner section has multiple pair of paralleling clamping surfaces being formed on the sidewall.

* * * * *